United States Patent
Ohashi

(10) Patent No.: US 12,151,647 B2
(45) Date of Patent: Nov. 26, 2024

(54) COMMUNICATION DEVICE AND STORAGE MEDIUM FOR PERFORMING RANGING BETWEEN A MOBILE OBJECT AND A PORTABLE DEVICE

(71) Applicant: KABUSHIKI KAISHA TOKAI RIKA DENKI SEISAKUSHO, Aichi (JP)

(72) Inventor: Yosuke Ohashi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 63 days.

(21) Appl. No.: 17/698,524

(22) Filed: Mar. 18, 2022

(65) Prior Publication Data
US 2022/0371548 A1 Nov. 24, 2022

(30) Foreign Application Priority Data
May 24, 2021 (JP) ................................. 2021-087005

(51) Int. Cl.
*B60R 25/24* (2013.01)
*G07C 9/00* (2020.01)
*H04B 17/318* (2015.01)

(52) U.S. Cl.
CPC .......... *B60R 25/24* (2013.01); *G07C 9/00309* (2013.01); *H04B 17/318* (2015.01); *G07C 2009/00793* (2013.01); *G07C 2209/63* (2013.01)

(58) Field of Classification Search
CPC .. B60R 25/24; H04B 17/318; G07C 9/00309; G07C 2009/00555

USPC ......................................................... 340/5.61
See application file for complete search history.

(56) References Cited

U.S. PATENT DOCUMENTS

| | | | |
|---|---|---|---|
| 5,708,712 A | * | 1/1998 | Brinkmeyer ............ B60R 25/04 713/181 |
| 9,566,945 B2 | | 2/2017 | Ghabra et al. |
| 10,972,196 B1 | | 4/2021 | Chu et al. |
| 11,528,153 B1 | * | 12/2022 | Sajdak .................... H04W 4/70 |

(Continued)

FOREIGN PATENT DOCUMENTS

| | | |
|---|---|---|
| JP | H11-107592 | 4/1999 |
| JP | 2012-162943 | 8/2012 |

(Continued)

*Primary Examiner* — Yong Hang Jiang
(74) *Attorney, Agent, or Firm* — GREENBLUM & BERNSTEIN, P.L.C.

(57) ABSTRACT

The present invention provides a technology capable of performing control such that ranging is performed more reliably in a mobile object and a portable device which is a regular communication partner. Provided is a communication device mounted on a mobile object including an acquisition unit configured to acquire a ranging trigger signal for starting measurement of a distance between the communication device and a portable device carried by a person and a communication control unit configured not to start ranging communication for measurement of the distance based on a fact that first specific information defined in advance and necessary for determination of the mobile object does not match second specific information included in the acquired ranging trigger signal and necessary for determination of the mobile object.

11 Claims, 4 Drawing Sheets

(56) References Cited

U.S. PATENT DOCUMENTS

| | | | | |
|---|---|---|---|---|
| 2006/0083406 A1* | 4/2006 | Ishimura | ............... | G01S 13/84 |
| | | | | 382/106 |
| 2012/0249296 A1* | 10/2012 | Savry | ................. | H04L 9/002 |
| | | | | 340/5.65 |
| 2018/0089918 A1* | 3/2018 | Murray | ................. | H04K 3/65 |
| 2018/0174387 A1* | 6/2018 | Lee | ................. | G07C 9/00309 |
| 2020/0336303 A1* | 10/2020 | Sierra | ................. | H04W 12/12 |
| 2022/0004220 A1* | 1/2022 | Ito | ................. | G06F 1/08 |
| 2022/0210641 A1 | 6/2022 | Ohashi | | |

FOREIGN PATENT DOCUMENTS

| | | | | |
|---|---|---|---|---|
| JP | 2020-172820 | | 10/2020 | |
| JP | 2021032742 A | * | 3/2021 | ........... B60R 25/245 |
| WO | 2016/148820 | | 9/2016 | |

* cited by examiner

COMMUNICATION DEVICE AND STORAGE MEDIUM FOR PERFORMING RANGING BETWEEN A MOBILE OBJECT AND A PORTABLE DEVICE

CROSS REFERENCE TO RELATED APPLICATION(S)

This application is based upon and claims benefit of priority from Japanese Patent Application No. 2021-087005, filed on May 24, 2021, the entire contents of which are incorporated herein by reference.

BACKGROUND

The present invention relates to a communication device and a storage medium.

In recent years, technologies for detecting positions of portable devices used by users have been disclosed. For example, a technology for detecting a position of a portable device used by a user based on a result of ranging communication between the portable device and each of two communication devices mounted in a mobile object is known (for example, see U.S. Pat. No. 9,566,945). In the technology, an operation of the mobile object is permitted when the detected position of the portable device satisfies a condition.

SUMMARY

However, it is preferable to perform control such that ranging is performed more reliably in a mobile object and a portable device which is a regular communication partner.

Accordingly, the present invention has been devised in view of the foregoing problems and an objective of the present invention is to provide a novel and improved technology capable of performing control such that ranging is performed more reliably between a mobile object and a portable device which is a regular communication partner.

To solve the above-described problems, according to an aspect of the present invention, there is provided a communication device mounted on a mobile object, the communication device includes an acquisition unit configured to acquire a ranging trigger signal for starting measurement of a distance between the communication device and a portable device carried by a person and a communication control unit configured not to start ranging communication for measurement of the distance based on a fact that first specific information defined in advance and necessary for determination of the mobile object does not match second specific information included in the acquired ranging trigger signal and necessary for determination of the mobile object.

In addition, to solve the above-described problems, according to another aspect of the present invention, there is provided a computer-readable non-transitory storage medium that stores a program causing a computer to function as a communication device that is mounted in a mobile object and includes an acquisition unit configured to acquire a ranging trigger signal for starting measurement of a distance between the communication device and a portable device carried by a person and a communication control unit configured not to start ranging communication for measurement of the distance based on a fact that first specific information defined in advance and necessary for determination of the mobile object does not match second specific information included in the acquired ranging trigger signal and necessary for determination of the mobile object.

As described above, the present invention provides a technology capable of performing control such that ranging is performed more reliably in a mobile object and a portable device which is a regular communication partner.

DETAILED DESCRIPTION OF THE EMBODIMENTS

Figure 1:
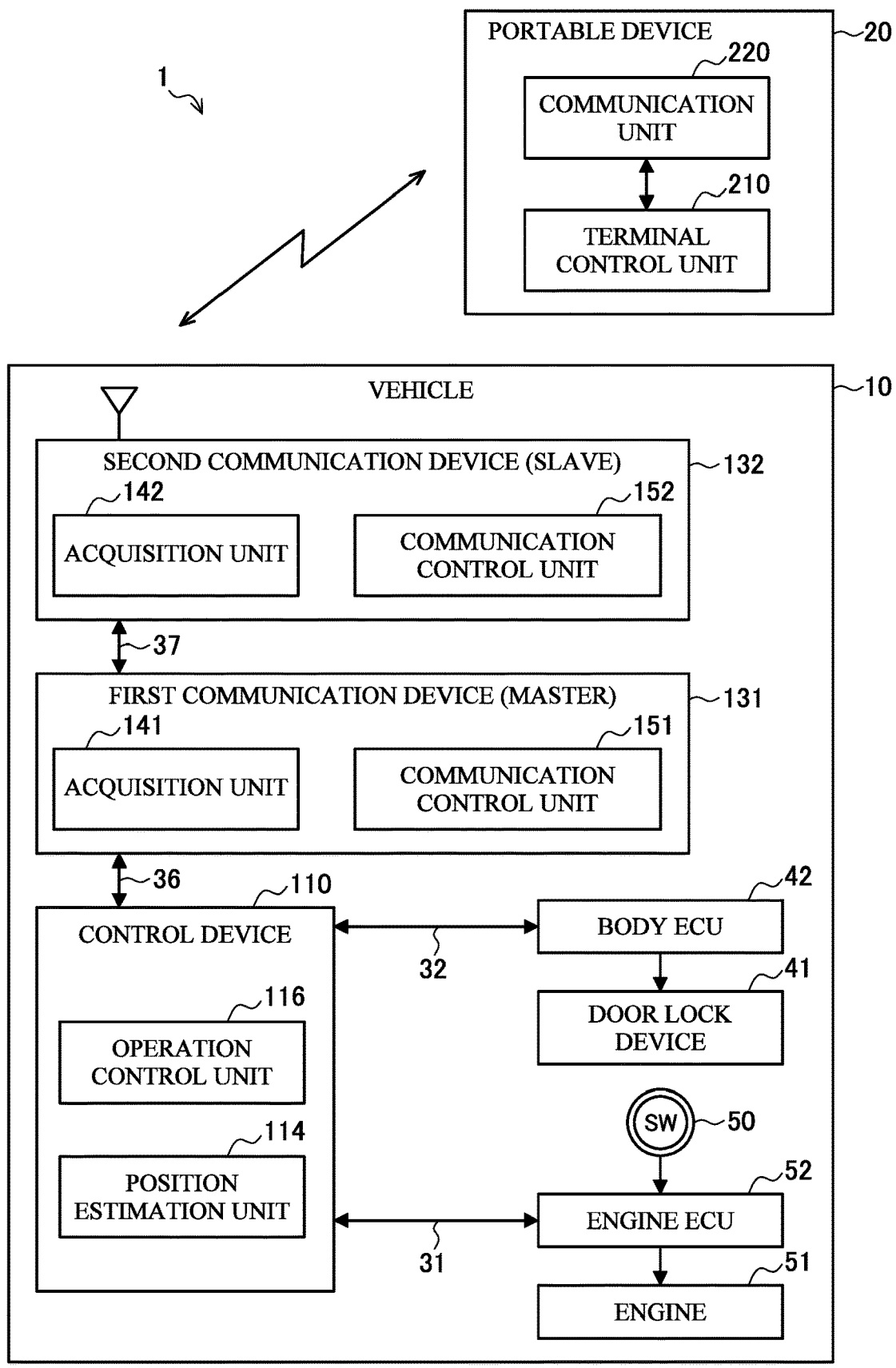
FIG. 1 is a diagram illustrating an exemplary configuration of a communication system according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. First Embodiment

Hereinafter, a communication system according to an embodiment of the present invention will be described.

1.1. Exemplary Configuration

First, an exemplary configuration of the communication system according to the embodiment of the present invention will be described.

FIG. 1 is a diagram illustrating an exemplary configuration of the communication system according to the embodiment of the present invention. As illustrated in FIG. 1, a communication system 1 according to the embodiment of the present invention includes a vehicle 10 (a first mobile object) and a portable device 20. The portable device 20 can be carried by a person and correspond to a regular communication partner of the vehicle 10. In the embodiment of the present invention, it is also assumed that there is a portable device (not illustrated) which is not a regular communication partner of the vehicle 10 in addition to the portable device 20.

The vehicle 10 is merely an example of a mobile object. Accordingly, instead of the vehicle 10, another mobile object (for example, a ship, an airplane, or the like) may be used. In the embodiment of the present invention, a case in which the portable device 20 is an electronic key is mainly assumed. However, the portable device 20 may be a terminal other than an electronic key, may be a smartphone, may be a tablet terminal, may be a mobile phone, or may be another electronic device.

Configuration of Vehicle

Next, a configuration of the vehicle 10 will be described. As illustrated in FIG. 1, the vehicle 10 includes a door lock device 41 which is an example of an in-vehicle device, a body electronic control unit (ECU) 42, an engine 51 which is an example of an in-vehicle device, an engine ECU 52, a control device 110, a first communication device 131, and a second communication device 132.

The door lock device 41 controls locking and unlocking of a door of the vehicle 10. The body ECU 42 manages power of in-vehicle electronic components. For example, the body ECU 42 drives the door lock device 41 under the control of the control device 110. For example, when a program corresponding to the body ECU 42 and recorded on a recording medium (not illustrated) is executed by a processor, a computer functions as the body ECU 42.

The engine 51 is an engine of the vehicle 10. The engine ECU 52 controls the engine 51. For example, the engine ECU 52 drives the engine 51 under the control of the control device 110. For example, when a program corresponding to the engine ECU 52 and recorded on a recording medium (not illustrated) is executed by a processor, a computer functions as the engine ECU 52.

The control device 110 includes a position estimation unit 114 and an operation control unit 116. The position estimation unit 114 and the operation control unit 116 will be described in detail below. For example, when a program corresponding to the control device 110 and recorded on a recording medium (not illustrated) is executed by a processor, a computer functions as the control device 110. For example, the control device 110 can correspond to a collating ECU that controls locking and unlocking of a door.

The first communication device 131 is mounted in the vehicle 10 and performs communication for obtaining a ranging value between the first communication device 131 and the portable device 20 (hereinafter also referred to as "ranging communication"). The first communication device 131 is connected to the second communication device 132 via a communication line 37. The first communication device 131 can function as a master communication device that controls the second communication device 132.

The first communication device 131 includes an acquisition unit 141 and a communication control unit 151. The acquisition unit 141 and the communication control unit 151 will be described in detail below. For example, when a program corresponding to the first communication device 131 and recorded on a recording medium (not illustrated) is executed by a processor, a computer functions as the first communication device 131.

The second communication device 132 is mounted in the vehicle 10 and performs ranging communication between the second communication device 132 and the portable device 20. The second communication device 132 is connected to the control device 110 via a communication line 36. The second communication device 132 can function as a slave communication device that is controlled by the first communication device 131.

The second communication device 132 includes an acquisition unit 142 and a communication control unit 152. The acquisition unit 142 and the communication control unit 152 will be described in detail below. For example, when a program corresponding to the second communication device 132 and recorded on a recording medium (not illustrated) is executed by a processor, a computer functions as the second communication device 132.

For example, a communication protocol in communication via the communication lines 36 and 37 may be a local interconnect network (LIN) or a controller area network (CAN). A communication interface such as a universal asynchronous receiver transmitter (UART) is used for the communication line 36.

The control device 110 and the body ECU 42 are connected via an internal communication line 32 of the vehicle 10. A protocol used for communication via the communication line 32 may be, for example, a CAN or an LIN. The control device 110 and the engine ECU 52 are connected via an internal communication line 31 of the vehicle 10. A protocol used for communication via the communication line 31 may be, for example, a CAN or an LIN.

Configuration of Portable Device

Next, a configuration of the portable device 20 will be described. The portable device 20 includes a terminal control unit 210 and a communication unit 220.

The terminal control unit 210 controls an operation of the portable device 20. For example, when a program corresponding to the terminal control unit 210 and recorded on a recording medium (not illustrated) is executed by a processor, a computer functions as the terminal control unit 210. For example, the terminal control unit 210 controls communication by the communication unit 220.

The communication unit 220 performs ranging communication between the first communication device 131 and the second communication device 132.

Overview of Ranging Communication

Next, an overview of the ranging communication will be described.

In the following description, in consideration of the fact that a ranging value between the portable device 20 and each of the first communication device 131 and the second communication device 132 is calculated with higher accuracy, a case in which a ranging value is calculated based on a propagation time of radio waves between the portable device 20 and each of the first communication device 131 and the second communication device 132 is mainly assumed. However, a ranging value may be calculated based on a value other than a propagation time of radio waves.

For example, a ranging value may be calculated based on strength (a received signal strength indicator (RSSI)) of radio waves transmitted by one of the first communication device 131 and the portable device 20 and received by the other. Similarly, a ranging value may be calculated based on the strength of the radio waves transmitted by one of the second communication device 132 and the portable device 20 and received by the other. That is, in the following description, a ranging value based on a propagation time of radio waves may be replaced with a ranging value in accordance with radio wave strength.

For example, a case in which a signal transmitted from the communication unit 220 of the portable device 20 and used to start measurement of a distance from the portable device 20 (hereinafter also referred to as a "ranging trigger signal") is acquired by the acquisition unit 141 of the first communication device 131 is assumed. In this case, the communication control unit 151 starts ranging communication between the first communication device 131 and the portable device 20 based on acquisition of a ranging trigger signal by the acquisition unit 141.

Similarly, a case in which a signal transmitted from the communication unit 220 of the portable device 20 and used to start measurement of a distance from the portable device 20 (hereinafter also referred to as a "ranging trigger signal")

is acquired by the acquisition unit 142 of the second communication device 132 is assumed. In this case, the communication control unit 152 starts ranging communication between the first communication device 131 and the portable device 20 based on acquisition of a ranging trigger signal by the acquisition unit 142.

In the embodiment of the present invention, a case in which radio waves used for ranging communication (in the following description, radio waves used for a ranging request, a ranging response, a ranging signal, and the like) are radio waves of an ultra-wideband (UWB) is mainly assumed. However, radio waves used for ranging communication are not limited to the radio waves of the UWB band. Further, in the embodiment of the present invention, a case in which radio waves used to transmit and receive a ranging trigger signal are radio waves of the UWB band is mainly assumed. However, radio waves used to transmit and receive the ranging trigger signal are not limited to the radio waves of the UWB band.

1.2. Comparative Example

Next, an exemplary operation of a communication system according to a comparative example will be described with reference to FIG. 2.

Figure 2:
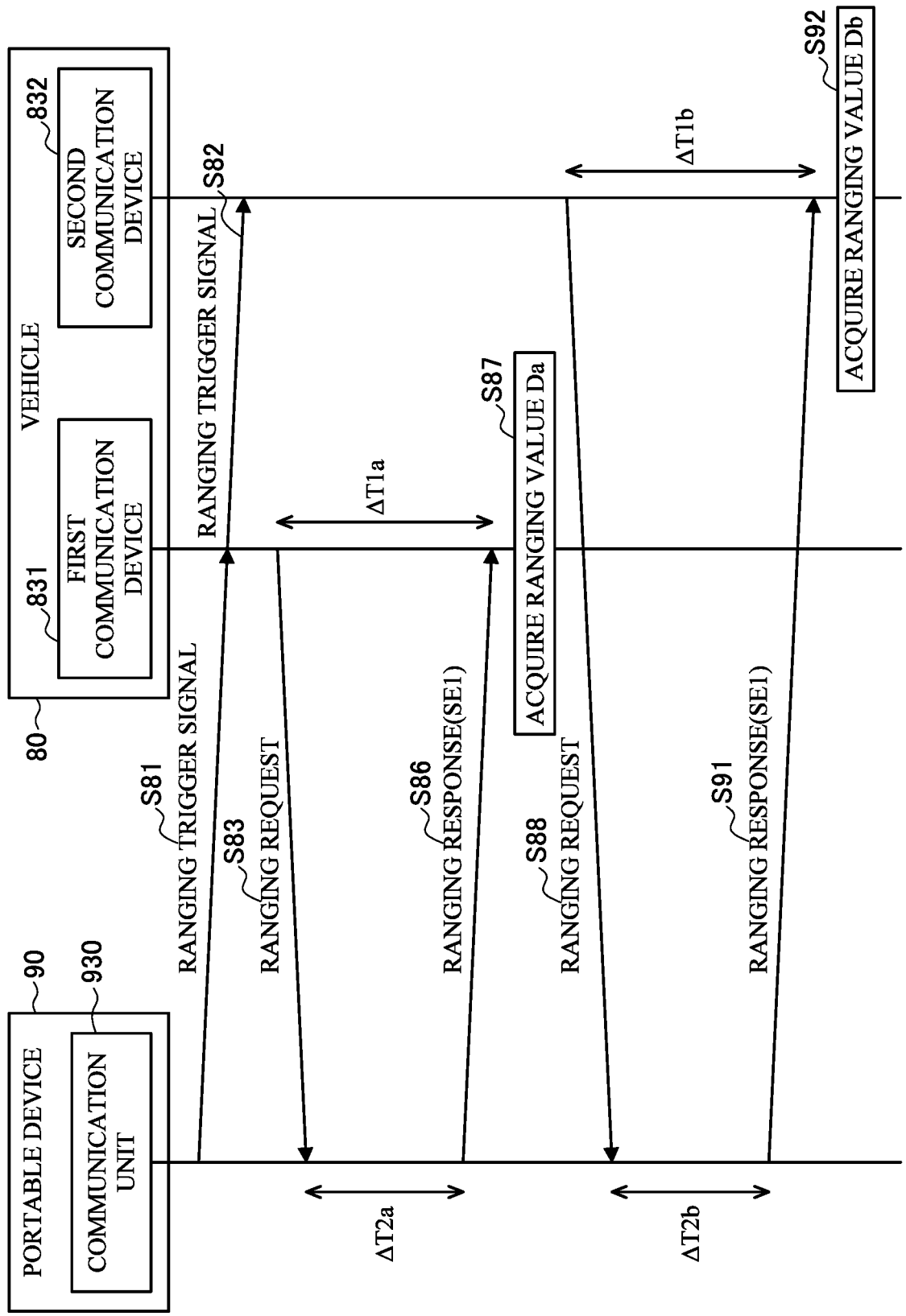
FIG. 2 is a sequence diagram illustrating an exemplary operation of the communication system according to a comparative example.

FIG. 2 is a sequence diagram illustrating an exemplary operation of the communication system according to a comparative example. As illustrated in FIG. 2, the communication system according to the comparative example includes a portable device 90 and a vehicle 80. The portable device 90 includes a communication unit 930. On the other hand, the vehicle 80 includes a first communication device 831 and a second communication device 832.

The vehicle 80 authenticates the portable device 90 based on information (authentication information) transmitted from the portable device 90 which is a regular communication partner. The vehicle 80 transmits a seed retained in the vehicle 80 to the portable device 90 when the authentication of the portable device 90 is successful. Thus, the seed is shared between the vehicle 80 and the portable device 90. Subsequently, the communication unit 930 of the portable device 90 transmits a ranging trigger signal.

When the ranging trigger signal is received (S81), the first communication device 831 starts ranging communication based on the reception of the ranging trigger signal. For example, the first communication device 831 transmits a signal for making a request for measurement of a distance between the first communication device 831 and the portable device 90 (hereinafter also referred to as a "ranging request") to the portable device 90 (S83).

When the ranging request is received, the communication unit 930 of the portable device 90 responds to the first communication device 831 with a response to the ranging request as a ranging response (S86). At this time, the portable device 90 includes a time ΔT2a from a reception time of the ranging request to a transmission time of the ranging response and a seed shared in advance between the vehicle 80 and the portable device 90 (denoted by "SE1" in FIG. 2) in the ranging response.

When the ranging response is received, the first communication device 831 compares the seed SE1 included in the ranging response with a seed retained in the vehicle 80. When the seed SE1 included in the ranging response matches the seed retained in the vehicle 80, the first communication device 831 obtains a result of the ranging communication based on a propagation time of the ranging request and the ranging response between the first communication device 831 and the communication unit 930 of the portable device 90. For example, the first communication device 831 calculates a ranging value Da as an example of a result of the ranging communication based on the propagation time (S87).

When the ranging trigger signal is received (S82), the second communication device 832 starts the ranging communication based on the reception of the ranging trigger signal. For example, the second communication device 832 transmits a signal for making a request for measurement of a distance (a ranging request) between the second communication device 832 and the portable device 90 to the portable device 90 (S88).

When a ranging request is received by the communication unit 930, the portable device 90 responds to the second communication device 832 with a response to the ranging request as a ranging response (S91). At this time, the portable device 90 includes a time ΔT2b from a reception time of the ranging request to a transmission time of the ranging response and the seed SE1 shared in advance between the vehicle 80 and the portable device 90 in the ranging response.

When the ranging response is received, the second communication device 832 compares the seed SE1 included in the ranging response with a seed retained in the vehicle 80. When the seed SE1 included in the ranging response matches the seed retained in the vehicle 80, the second communication device 832 obtains a result of the ranging communication based on a propagation time of the ranging request and the ranging response between the second communication device 832 and the communication unit 930 of the portable device 90. For example, the second communication device 832 calculates a ranging value Db as an example of a result of the ranging communication based on the propagation time (S92).

In the comparative example, however, there is a possibility of the ranging not being performed between the vehicle 80 and the portable device 90 which is a regular communication partner. More specifically, in the comparative example, when the seed SE1 included in the ranging response transmitted from the portable device does not match the seed retained in the vehicle 80, the communication may fail, and thus there is a possibility of the ranging being unable to be performed.

For example, when the vehicle 80 receives the ranging trigger signal from a portable device which is not a regular communication partner, the seed SE1 included in the ranging response received from the portable device does not match the seed retained in the vehicle 80. Therefore, the communication fails, and thus there is a possibility of the ranging being unable to be performed.

Accordingly, in the embodiment of the preset invention, a technology for controlling the ranging such that the ranging between the vehicle 80 and the portable device 90 which is a regular communication partner of the vehicle 80 is performed more reliably will be mainly proposed.

1.3. Exemplary Operation of Embodiment

First Exemplary Operation

Next, a first exemplary operation of the communication system 1 according to the embodiment of the present invention will be described with reference to FIG. 3. In the embodiment of the present invention, specific information necessary for determination of the vehicle 10 (first specific information) is registered in advance in a recording medium (not illustrated) of the vehicle 10.

Figure 3:
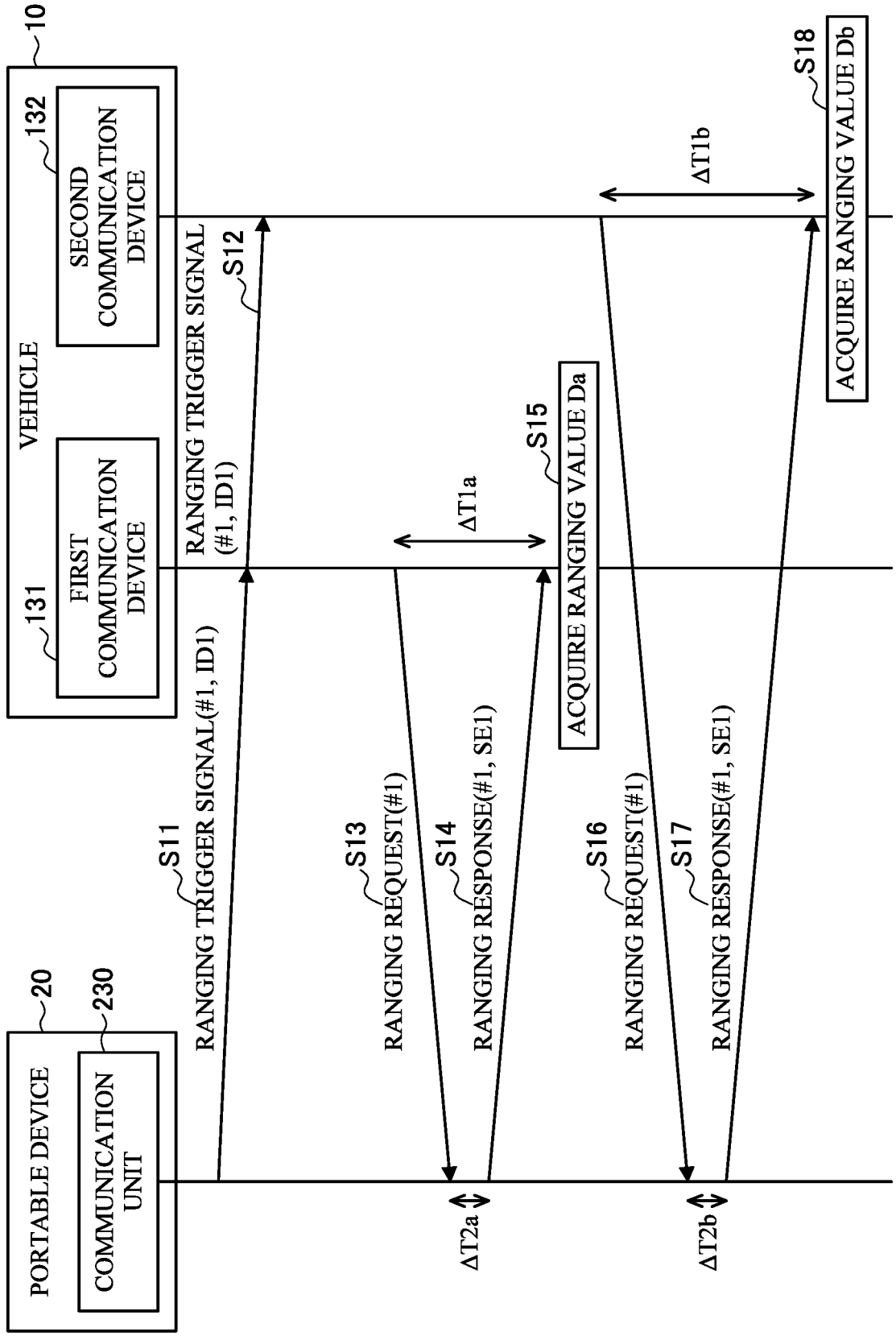
FIG. 3 is a sequence diagram illustrating a first exemplary operation of the communication system according to the present invention.

FIG. 3 is a sequence diagram illustrating the first exemplary operation of the communication system 1 according to the embodiment of the present invention. First, the vehicle 10 authenticates the portable device 20 based on information (authentication information) transmitted from the portable device 20 which is a regular communication partner. When the authentication of the portable device 20 is successful, the vehicle 10 transmits the seed retained in the vehicle 10 and specific information registered in advance in a recording medium (not illustrated) to the portable device 20. Thus, the seed and the specific information are shared between the vehicle 10 and the portable device 20.

Further, in the first communication device 131, the communication control unit 151 transitions to a reception waiting state of the ranging trigger signal based on the successful authentication of the portable device 20. Similarly, in the second communication device 132, the communication control unit 152 transitions to a reception waiting state of the ranging trigger signal based on the successful authentication of the portable device 20.

Subsequently, the portable device 20 transmits a ranging trigger signal including the specific information received from the vehicle 10 and counter information in accordance with the past number of times the ranging trigger signal has been transmitted from the portable device 20 to the vehicle 10 (that is, the first communication device 131 or the second communication device 132). For example, the counter information may be a value obtained by adding 1 to the past number of times the ranging trigger signal has been transmitted from the portable device 20 to the vehicle 10.

In the example illustrated in FIG. 3, a case in which the vehicle 10 receives the ranging trigger signal from the portable device 20 which is a regular communication partner sharing the seed (denoted by "SE1" in FIG. 3) in advance is assumed. However, as will be described below, the ranging trigger signal received by the vehicle 10 can be a ranging trigger signal transmitted from a portable device which is not a regular communication partner in some cases.

Here, a portable device of a transmission source of the ranging trigger signal (the first ranging trigger signal) received by the vehicle 10 corresponds to the first portable device irrespective of whether the portable device of the transmission source of the ranging trigger signal (the first ranging trigger signal) received by the vehicle 10 is a regular communication partner. The specific information included in the ranging trigger signal corresponds to second specific information. The second specific information is information necessary for determination of a second mobile object (that is, the vehicle 10 or a vehicle different from the vehicle 10).

As illustrated in FIG. 3, when the acquisition unit 141 of the first communication device 131 acquires the ranging trigger signal including the specific information (denoted by "ID1" in FIG. 3) and the counter information (denoted by "#1" in FIG. 3) (S11), the communication control unit 151 compares the specific information registered in advance in a recording medium (not illustrated) with the specific information included in the ranging trigger signal. When the specific information matches each other, the communication control unit 151 considers that the portable device 20 transmitting the ranging trigger signal is a suitable portable device and starts ranging communication (first ranging communication) based on the fact that the specific information matches each other.

For example, the communication control unit 151 controls transmission of a signal for making a request for measurement of a distance between the first communication device 131 and the portable device 20 (a ranging request) to the portable device 20 (S13). At this time, the communication control unit 151 includes the ranging request transmitted to the portable device 20 in the counter information #1.

When the ranging request is received, the communication unit 230 of the portable device 20 responds to the first communication device 131 with a response to the ranging request as a ranging response (S14). At this time, the terminal control unit 210 of the portable device 20 includes the counter information #1, a time ΔT2a from a reception time of the ranging request to a transmission time of the ranging response, and the seed SE1 shared in advance between the vehicle 10 and the portable device 20 in the ranging response.

In the first communication device 131, when the acquisition unit 141 acquires the ranging response, the communication control unit 151 compares the seed SE1 included in the ranging response with the seed retained in the vehicle 10. When the seed SE1 included in the ranging response matches the seed retained in the vehicle 10, the communication control unit 151 obtains a result of the ranging communication based on a propagation time of the ranging request and the ranging response between the first communication device 131 and the communication unit 230 of the portable device 20. For example, the communication control unit 151 calculates a ranging value Da as an example of a result of the ranging communication based on the propagation time (S15).

More specifically, the communication control unit 151 acquires the time ΔT2a from the reception time of the ranging request to the transmission time of the ranging response from the ranging response. Then, the communication control unit 151 can calculate, as a propagation time, a difference between the time ΔT1a from the transmission time of the ranging request to the reception time of the ranging response and the time ΔT2a from the reception time of the ranging request to the transmission time of the ranging response and can calculate the ranging value Da based on the propagation time. For example, the communication control unit 151 may set the propagation time or a half of the propagation time (that is, a one-way propagation time) as the ranging value Da or may calculate the ranging value Da by multiplying the propagation time or the half of the propagation time by a speed of the radio waves.

In the second communication device 132, when the acquisition unit 142 acquires the ranging trigger signal including specific information ID1 and the counter information #1 (S12), the communication control unit 152 compares the specific information registered in advance in a recording medium (not illustrated) with the specific information included in the ranging trigger signal. When the specific information matches each other, the communication control unit 152 starts the ranging communication (the first ranging communication) based on the fact that the specific information matches each other.

For example, the communication control unit 152 controls transmission of a signal for making a request for measurement of a distance between the second communication device 132 and the portable device 20 (a ranging request) to the portable device 20 (S16). At this time, the communication control unit 152 includes the counter information #1 in the ranging request transmitted to the portable device 20.

When the ranging request is received, the communication unit 230 of the portable device 20 responds to the second communication device 132 with a response to the ranging request as a ranging response (S17). At this time, the terminal control unit 210 of the portable device 20 includes the counter information #1, a time ΔT2b from a reception time of the ranging request to a transmission time of the ranging response, and the seed SE1 shared in advance between the vehicle 10 and the portable device 20 in the ranging response.

In the second communication device 132, when the acquisition unit 142 acquires the ranging response, the communication control unit 152 compares the seed SE1 included in the ranging response with the seed retained in the vehicle 10. When the seed SE1 included in the ranging response matches the seed retained in the vehicle 10, the communication control unit 151 obtains a result of the ranging communication based on a propagation time of the ranging request and the ranging response between the second communication device 132 and the communication unit 230 of the portable device 20. For example, the communication control unit 152 calculates a ranging value Db as an example of a result of the ranging communication based on the propagation time (S18).

More specifically, the communication control unit 152 acquires the time ΔT2b from the reception time of the ranging request to the transmission time of the ranging response from the ranging response. Then, the communication control unit 152 can calculate, as a propagation time, a difference between the time ΔT1b from the transmission time of the ranging request to the reception time of the ranging response and the time ΔT2b from the reception time of the ranging request to the transmission time of the ranging response and can calculate the ranging value Db based on the propagation time. For example, the communication control unit 152 may set the propagation time or a half of the propagation time (that is, a one-way propagation time) as the ranging value Db or may calculate the ranging value Db by multiplying the propagation time or the half of the propagation time by a speed of the radio waves.

In the example illustrated in FIG. 3, a case in which the vehicle 10 receives the ranging trigger signal from the portable device 20 which is a regular communication partner sharing the seed SE1 in advance is assumed. However, as described above, the ranging trigger signal received by the vehicle 10 can be a ranging trigger signal transmitted from a portable device which is not a regular communication partner in some cases. An exemplary operation of the communication system 1 will be described below on the assumption of the cases.

In the first communication device 131, the acquisition unit 141 acquires the ranging trigger signal from the portable device which is not a regular communication partner. The ranging trigger signal includes specific information and counter information. However, the portable device which is not a regular communication partner does not retain specific information matching the specific information retained by the vehicle 10. Accordingly, the communication control unit 151 determines that the specific information registered in advance in a recording medium (not illustrated) does not match the specific information included in the ranging trigger signal.

At this time, the communication control unit 151 considers that the portable device transmitting the ranging trigger signal is not a suitable portable device and does not start the ranging communication (the first ranging communication) based on the fact that the specific information does not match each other. Thus, since the comparison between the seeds performed in the ranging communication is not made, the non-matching between the seeds and the failure of the communication do not occur, and thus it is possible to reduce a possibility of the ranging being unable to be performed. In other words, control can be performed such that the ranging between the vehicle 10 and the portable device 20 which is a regular communication partner is performed more reliably.

More specifically, the communication control unit 151 does not start the ranging communication and maintains the reception waiting state of the ranging trigger signal based on the fact that the specific information does not match each other. Thus, the communication control unit 151 can wait for reception of the ranging trigger signal from the portable device 20 which is a regular communication partner. For example, the communication control unit 151 may not start the ranging communication by not controlling transmission to a portable device which is not a regular communication partner of the ranging request. The communication control unit 151 may cancel the reception waiting state based on the fact that a predetermined time has passed from the transition to the reception waiting state.

In the second communication device 132, the acquisition unit 142 acquires the ranging trigger signal from a portable device which is not a regular communication partner. As in the communication control unit 151, the communication control unit 152 determines that the specific information registered in advance in a recording medium (not illustrated) does not match the specific information included in the ranging trigger signal. The communication control unit 152 does not start the ranging communication (the first ranging communication) based on the fact that the specific information does not match each other.

More specifically, the communication control unit 152 does not start the ranging communication and maintains the reception waiting state of the ranging trigger signal based on the fact that the specific information does not match each other. For example, the communication control unit 152 may not start the ranging communication by not controlling transmission to a portable device which is not a regular communication partner of the ranging request. The communication control unit 152 may cancel the reception waiting state based on the fact that a predetermined time has passed from the transition to the reception waiting state.

Next, a case in which the vehicle 10 receives the ranging trigger signal from the portable device 20 which is a regular communication partner in the reception waiting state is assumed. Here, a portable device of a transmission source of the ranging trigger signal (the second ranging trigger signal) received by the vehicle 10 corresponds to the second portable device irrespective of whether the portable device of the transmission source of the ranging trigger signal (the second ranging trigger signal) received by the vehicle 10 is a regular communication partner.

In the first communication device 131, the acquisition unit 141 acquires the ranging trigger signal from the portable device 20 which is a regular communication partner in the reception waiting state. The ranging trigger signal includes specific information and counter information. The portable device 20 which is a regular communication partner retains the specific information matching the specific information retained by the vehicle 10. Therefore, the communication control unit 151 determines that the specific information registered in advance in a recording medium (not illustrated) matches the specific information included in the ranging trigger signal.

At this time, the communication control unit 151 starts the ranging communication (the second ranging communication) based on the fact that the specific information matches each other. For example, the communication control unit 151 controls transmission of a signal for making a request for measurement of a distance (a second distance) between the first communication device 131 and the portable device 20 (a second ranging request) to the portable device 20 (S13). At this time, the communication control unit 151 includes the counter information #1 in the ranging request transmitted to the portable device 20. Thereafter, processing similar to the foregoing S14 and S15 can be performed.

In the second communication device 132, the acquisition unit 142 acquires the ranging trigger signal from the portable device 20 which is a regular communication partner in the reception waiting state. As in the communication control unit 151, the communication control unit 152 determines that the specific information registered in advance in a recording medium (not illustrated) matches the specific information included in the ranging trigger signal.

At this time, the communication control unit 152 starts the ranging communication (the second ranging communication) based on the fact that the specific information matches each other. For example, the communication control unit 152 controls transmission of a signal for making a request for measurement of a distance (a second distance) between the second communication device 132 and the portable device 20 (a second ranging request) to the portable device 20 (S16). At this time, the communication control unit 152 includes the counter information #1 in the ranging request transmitted to the portable device 20. Thereafter, processing similar to the foregoing S17 and S18 can be performed.

The communication control unit 151 outputs the counter information #1 and the ranging value Da obtained as an example of a result of the ranging communication to the control device 110. The communication control unit 152 outputs the counter information #1 and the ranging value Db obtained as an example of a result of the ranging communication to the control device 110. In this way, by outputting the counter information associated with the result of the ranging communication, it is possible to guarantee a temporal correspondence relation between the result of the ranging communication between the portable device 20 and the first communication device 131 and the result of the ranging communication between the portable device 20 and the second communication device 132.

The position estimation unit 114 estimates the position of the portable device 20 based on the result of the ranging communication between the portable device 20 and the first communication device 131 and the result of the ranging communication between the portable device 20 and the second communication device 132.

An example of a process of estimating the position of the portable device 20 will be described in detail as follows. That is, a position of the first communication device 131 and a position of the second communication device 132 are registered in advance in a recording medium (not illustrated) of the vehicle 10. The position estimation unit 114 acquires the position of the first communication device 131 and the position of the second communication device 132 from the recording medium (not illustrated) of the vehicle 10.

The position estimation unit 114 calculates a position (hereinafter referred to as a "first candidate position") in accordance with the result of the ranging communication between the portable device 20 and the first communication device 131 and the position of the first communication device 131. For example, the first candidate position may be a circumference or a sphere that has the ranging value between the portable device 20 and the first communication device 131 as a radius using the position of the first communication device 131 as a reference.

Similarly, the position estimation unit 114 calculates a position (hereinafter referred to as a "second candidate position") in accordance with the result of the ranging communication between the portable device 20 and the second communication device 132 and the position of the second communication device 132. For example, the second candidate position may be a circumference or a sphere that has the ranging value between the portable device 20 and the second communication device 132 as a radius using the position of the second communication device 132 as a reference.

The position estimation unit 114 estimates a position of the portable device 20 based on the position of the first and second candidate positions calculated in this way. For example, the position estimation unit 114 can estimate a position at which the first and second candidate positions overlap as the position of the portable device 20. The position estimation unit 114 may calculate the position of the portable device 20 as 2-dimensional coordinates or 3-dimensional coordinates. Alternatively, the position estimation unit 114 may estimate an area to which the 2-dimensional coordinates or the 3-dimensional coordinates of the portable device 20 calculated in this way belong as the position of the portable device 20.

Alternatively, a case in which the ranging communication between the portable device 20 and the first communication device 131 and the ranging communication between the communication device 20 and the second communication device 132 are each performed a plurality of times (for example, 5 times) is also assumed. In this case, since there is a possibility of a minimum ranging value (at which reflection of radio waves from obstacles is small) among a plurality of ranging values having the highest accuracy, the minimum ranging value is preferably used to estimate the position of the portable device 20.

The operation control unit 116 controls execution of the process in accordance with the position of the portable device 20 estimated by the position estimation unit 114. For example, the operation control unit 116 controls an operation of the vehicle 10 based on the position of the portable device 20 estimated by the position estimation unit 114. Thus, since the operation of the vehicle 10 is controlled in accordance with the position of the portable device 20, convenience for the user is improved.

More specifically, the operation control unit 116 may permit a locking or unlocking operation of the door lock device 41 by the body ECU 42 when it is determined that the position of the portable device 20 estimated by the position estimation unit 114 is outside of the vehicle. Thus, for example, when a touching operation is performed on a vehicle exterior door handle at the time of locking of the door, the vehicle door is unlocked. When a pushing operation is performed on a lock button of a vehicle exterior door handle at the time of unlocking of the door, the vehicle door is locked.

As another example, the operation control unit 116 may permit to start an engine of the vehicle 10 when it is determined that the position of the portable device 20 estimated by the position estimation unit 114 is inside the vehicle. Then, for example, when the start switch 50 is manipulated while stepping a brake pedal, the engine 51 is started. More specifically, the operation control unit 116 may permit a transition manipulation of vehicle power by the start switch 50 inside the vehicle when it is determined that the position of the portable device 20 estimated by the position estimation unit 114 is inside the vehicle.

An operation control target of the operation control unit 116 is not limited to a machine or a device of the vehicle 10. The operation control unit 116 may control an operation of a machine or a device other than the vehicle 10 based on the position of the portable device 20 estimated by the position estimation unit 114.

Second Exemplary Operation

Next, a second exemplary operation of the communication system 1 according to the embodiment of the present invention will be described with reference to FIG. 4. As in the first exemplary operation described with reference to FIG. 3, specific information necessary for determination of the vehicle 10 (first specific information) is registered in advance in a recording medium (not illustrated) of the vehicle 10.

Figure 4:
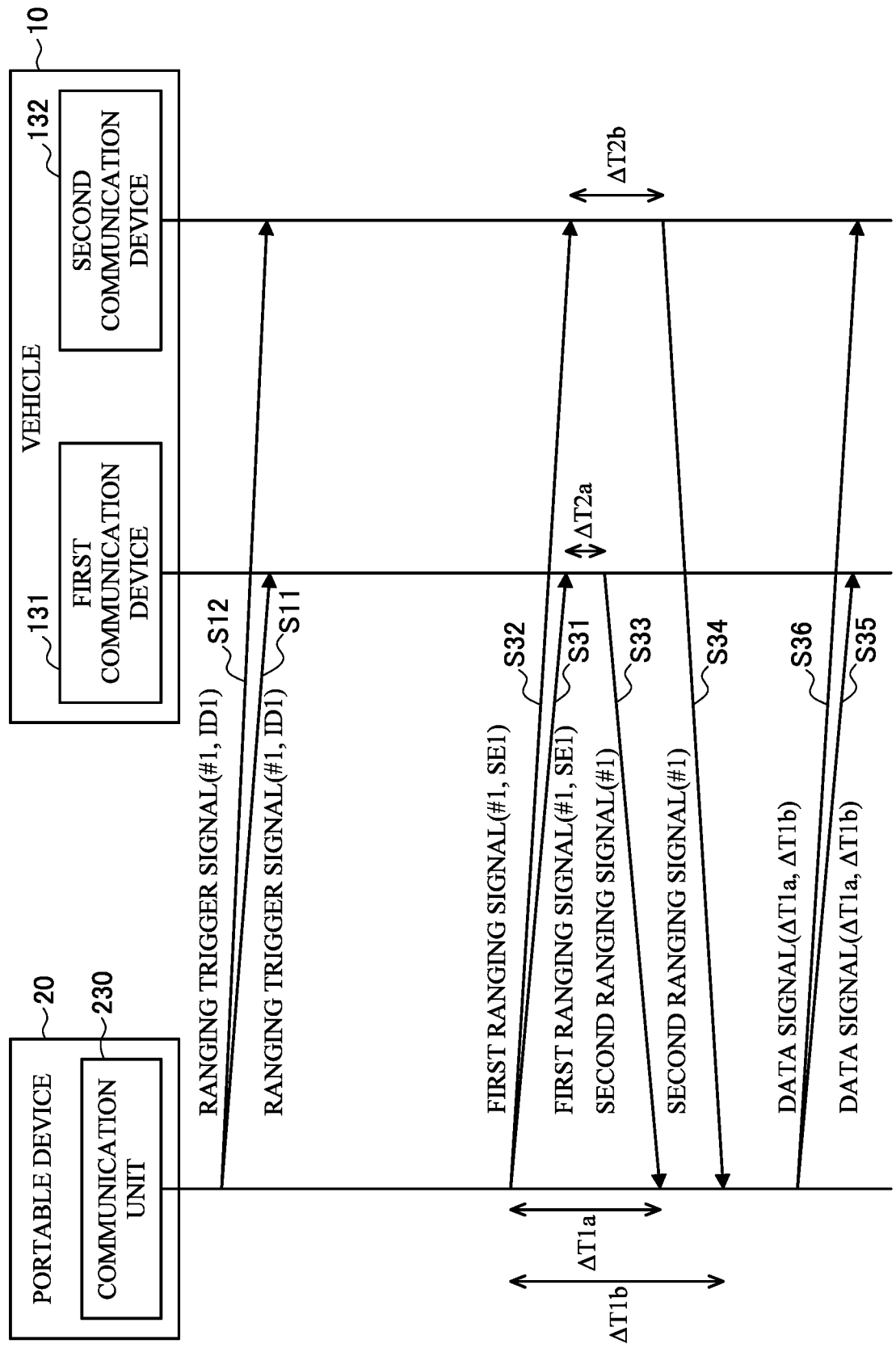
FIG. 4 is a sequence diagram illustrating a second exemplary operation of the communication system according to the present invention.

FIG. 4 is a sequence diagram illustrating the second exemplary operation of the communication system 1 according to the embodiment of the present invention. As in the first exemplary operation described with reference to FIG. 3, the seed and the specific information are shared between the vehicle 10 and the portable device 20. Further, as in the first exemplary operation described with reference to FIG. 3, the communication control unit 151 transitions to a reception waiting state of the ranging trigger signal based on the successful authentication of the portable device 20. Similarly, in the second communication device 132, the communication control unit 152 transitions to a reception waiting state of the ranging trigger signal based on the successful authentication of the portable device 20.

Next, as in the first exemplary operation described with reference to FIG. 3, the portable device 20 transmits a ranging trigger signal including the specific information received from the vehicle 10 and counter information in accordance with the past number of times the ranging trigger signal has been transmitted from the portable device 20 to the vehicle 10 (that is, the first communication device 131 or the second communication device 132).

As illustrated in FIG. 4, when the acquisition unit 141 of the first communication device 131 acquires the ranging trigger signal including the specific information ID1 and the counter information #1 (S11), the communication control unit 151 compares the specific information registered in advance in a recording medium (not illustrated) with the specific information included in the ranging trigger signal. When the specific information matches each other, the communication control unit 151 starts ranging communication (first ranging communication) based on the fact that the specific information matches each other.

For example, the communication control unit 151 waits for reception of a signal used to measure a distance between the first communication device 131 and the portable device 20 (hereinafter also referred to as a "ranging signal") from the portable device 20.

Similarly, in the second communication device 132, when the acquisition unit 142 acquires the ranging trigger signal including specific information ID1 and the counter information #1 (S12), the communication control unit 152 compares the specific information registered in advance in a recording medium (not illustrated) with the specific information included in the ranging trigger signal. When the specific information matches each other, the communication control unit 152 starts the ranging communication (the first ranging communication) based on the fact that the specific information matches each other.

For example, the communication control unit 152 waits for reception of a signal used to measure a distance between the second communication device 132 and the portable device 20 (hereinafter also referred to as a "ranging signal") from the portable device 20.

The communication unit 230 of the portable device 20 transmits the first ranging signal. At this time, the terminal control unit 210 of the portable device 20 includes the counter information #1 and the seed SE1 shared in advance between the vehicle 10 and the portable device 20 in the first ranging signal.

When the acquisition unit 141 acquires the first ranging signal (S32), the communication control unit 151 of the first communication device 131 compares the seed SE1 included in the first ranging signal with the seed retained in the vehicle 10. When the seed SE1 included in the first ranging signal matches the seed retained in the vehicle 10, the communication control unit 151 transmits the second ranging signal (S33). At this time, the communication control unit 151 includes the counter information #1 in the second ranging signal.

When the acquisition unit 142 acquires the first ranging signal (S33), the communication control unit 152 of the second communication device 132 compares the seed SE1 included in the first ranging signal with the seed retained in the vehicle 10. When the seed SE1 included in the first ranging signal matches the seed retained in the vehicle 10, the communication control unit 151 transmits the second ranging signal (S34). At this time, the communication control unit 152 includes the counter information #1 in the second ranging signal.

When the communication unit 230 receives the second ranging signal from the first communication device 131, the terminal control unit 210 of the portable device 20 calculates the time $\Delta T1a$ from a transmission time of the first ranging signal to a reception time of the second ranging signal from the first communication device 131. Further, when the communication unit 230 receives the second ranging signal from the second communication device 132, the terminal control unit 210 of the portable device 20 calculates the time $\Delta T1b$ from a transmission time of the first ranging signal to a reception time of the second ranging signal from the second communication device 132.

The communication unit 230 of the portable device 20 transmits a data signal which is a signal including data. At this time, the terminal control unit 210 includes the time $\Delta T1a$ from the transmission time of the first ranging signal to the reception time of the second ranging signal from the first communication device 131, the time $\Delta T1b$ from the transmission time of the first ranging signal to the reception time of the second ranging signal from the second communication device 132, and the counter information #1 in the data signal.

When the acquisition unit 141 acquires the data signal (S35), the communication control unit 151 of the first communication device 131 calculates a time $\Delta T20a$ from a reception time of the first ranging signal to a transmission time of the second ranging signal. The communication control unit 151 outputs the counter information #1 and $\Delta T1a$, $\Delta T2a$, and $\Delta T1b$ which are examples of results of the ranging communication to the control device 110.

When the acquisition unit 142 acquires the data signal (S36), the communication control unit 152 of the second communication device 132 calculates a time $\Delta T2b$ from a reception time of the first ranging signal to a transmission time of the second ranging signal. The communication control unit 152 outputs the counter information #1 and ΔT1b, ΔT2b, and ΔT1a which are examples of results of the ranging communication to the control device 110.

In this way, ΔT1a and ΔT1b are output from the first communication device 131 and the second communication device 132 to the control device 110 in duplicate. Then, even if at least one of ΔT1a and ΔT1b is not received from the portable device 20 in one of the first communication device 131 and the second communication device 132, there is a high possibility of both ΔT1a and ΔT1b being able to be input to the control device 110.

In the example illustrated in FIG. 4, a case in which the vehicle 10 receives the ranging trigger signal from the portable device 20 which is a regular communication partner sharing the seed SE1 in advance is assumed. However, as described above, the ranging trigger signal received by the vehicle 10 can be a ranging trigger signal transmitted from a portable device which is not a regular communication partner in some cases. An exemplary operation of the communication system 1 will be described below on the assumption of the cases.

In the first communication device 131, the acquisition unit 141 acquires the ranging trigger signal from the portable device which is not a regular communication partner. The ranging trigger signal includes specific information and counter information. However, the portable device which is not a regular communication partner does not retain specific information matching the specific information retained by the vehicle 10. Accordingly, the communication control unit 151 determines that the specific information registered in advance in a recording medium (not illustrated) does not match the specific information included in the ranging trigger signal.

At this time, as in the first exemplary operation described with reference to FIG. 3, the communication control unit 151 does not start the ranging communication (the first ranging communication) based on the fact that the specific information does not match each other. More specifically, the communication control unit 151 does not start the ranging communication and maintains the reception waiting state of the ranging trigger signal based on the fact that the specific information does not match each other.

For example, the communication control unit 151 may not respond with the second ranging signal corresponding to the first ranging signal even when the first ranging signal is received from a portable device which is not a regular communication partner. The communication control unit 151 may cancel the reception waiting state based on the fact that a predetermined time has passed from the transition to the reception waiting state.

In the second communication device 132, the acquisition unit 142 acquires the ranging trigger signal from a portable device which is not a regular communication partner. As in the communication control unit 151, the communication control unit 152 determines that the specific information registered in advance in a recording medium (not illustrated) does not match the specific information included in the ranging trigger signal.

At this time, as in the communication control unit 151, the communication control unit 152 does not start the ranging communication (the first ranging communication) based on the fact that the specific information does not match each other. More specifically, the communication control unit 152 does not start the ranging communication and maintains the reception waiting state of the ranging trigger signal based on the fact that the specific information does not match each other.

For example, as in the communication control unit 151, the communication control unit 152 may not respond with the second ranging signal corresponding to the first ranging signal even if the first ranging signal is received from the portable device which is not a regular communication partner. As in the communication control unit 151, the communication control unit 152 may cancel the reception waiting state based on the fact that a predetermined time has passed from the transition to the reception waiting state.

Next, a case in which the vehicle 10 receives the ranging trigger signal from the portable device 20 which is a regular communication partner in the reception waiting state is assumed.

In the first communication device 131, the acquisition unit 141 acquires the ranging trigger signal from the portable device 20 which is a regular communication partner in the reception waiting state. The ranging trigger signal includes specific information and counter information. The portable device 20 which is a regular communication partner retains the specific information matching the specific information retained by the vehicle 10. Therefore, the communication control unit 151 determines that the specific information registered in advance in a recording medium (not illustrated) matches the specific information included in the ranging trigger signal.

At this time, the communication control unit 151 starts the ranging communication (the second ranging communication) based on the fact that the specific information matches each other. For example, the communication control unit 151 waits for reception of a signal used to measure a distance (a second distance) between the first communication device 131 and the portable device 20 (a first ranging signal) to the portable device 20. Thereafter, processing similar to the foregoing S31, S33, and S35 can be performed.

In the second communication device 132, the acquisition unit 142 acquires the ranging trigger signal from the portable device 20 which is a regular communication partner in the reception waiting state. As in the communication control unit 151, the communication control unit 152 determines that the specific information registered in advance in a recording medium (not illustrated) matches the specific information included in the ranging trigger signal.

At this time, the communication control unit 152 starts the ranging communication (the second ranging communication) based on the fact that the specific information matches each other. For example, the communication control unit 152 waits for reception of a signal used to measure a distance (a second distance) between the second communication device 132 and the portable device 20 (the first ranging signal) to the portable device 20. Thereafter, processing similar to the foregoing S32, S34, and S36 can be performed.

As in the first exemplary operation described with reference to FIG. 3, the position estimation unit 114 estimates a position of the portable device 20 based on a result of the ranging communication between the portable device 20 and the first communication device 131 and a result of the ranging communication between the portable device 20 and the second communication device 132. Further, as in the first exemplary operation described with reference to FIG. 3, the operation control unit 116 controls execution of the process in accordance with the position of the portable 20 estimated by the position estimation unit 114.

1.4. Advantages

According to the foregoing embodiment, the first communication device 131 is mounted in the vehicle 10. There is provided the first communication device 131 including the acquisition unit 141 that acquires the first ranging trigger signal for starting measurement of the first distance between the first communication device 131 and the portable device and the communication control unit 151 that does not start the first ranging communication for measurement of the first distance based on the fact that first specific information registered in advance and necessary for determination of the vehicle 10 does not match second specific information included in the first ranging trigger signal and necessary for determination of the vehicle.

In the configuration, since the comparison between the seeds performed in the ranging communication is not made, the non-matching between the seeds and the failure of the communication do not occur, and thus it is possible to reduce a possibility of the ranging being unable to be performed. In other words, control can be performed such that the ranging between the vehicle 10 and the portable device which is a regular communication partner is performed more reliably.

The first communication device 131 can be replaced with the second communication device 132.

1.5. Modified Examples

The preferred embodiments of the present invention have been described in detail above with reference to the appended drawings, but the present invention is not limited to the examples. It should be apparent to those skilled in the technical field of the present invention that various modifications and corrections can be made in various forms within the scope of the technical spirit described in the claims, and the modifications and the corrections, of course, belong to the technical scope of the present invention.

Modified Example of Ranging Trigger Signal

For example, the example in which the ranging trigger signal is transmitted with the UWB radio waves has been mainly described above. However, a signal treated as the ranging trigger signal is not limited. For example, the ranging trigger signal may be a connection request signal transmitted from the portable device 20 as a response to an advertisement signal sent by a Bluetooth (registered trademark) low energy (BLE) device (not illustrated) of the vehicle 10. Alternatively, the ranging trigger signal may be an acknowledgement signal transmitted from the portable device 20 as a response to a wake signal.

At this time, for example, in the vehicle 10, an LF transmitter (not illustrated) performs LF transmission of a wake signal. In the portable device 20, when an LF reception unit (not illustrated) receives a wake signal, the terminal control unit 210 is started from a waiting state and a UHF transmission unit (not illustrated) performs UHF transmission of an acknowledge signal. In the vehicle 10, when a UHF receiver (not illustrated) receives an acknowledge signal to a wake signal from the portable device 20, the terminal control unit 210 controls an output of a ranging request.

Alternatively, the ranging trigger signal may be a signal indicating that a manipulation has been performed on a door knob of a vehicle door or may be a signal indicating that a manipulation has been performed on the start switch 50.

Modified Example of Operation Permission

The case in which the operation control unit 116 controls an operation of the vehicle 10 based on a position of the portable device 20 estimated by the position estimation unit 114 has been mainly described above. In particular, when it is determined that the position of the portable device 20 is outside of the vehicle, the locking or unlocking of a door of the vehicle 10 is permitted, as described above. When it is determined that the position of the portable device 20 is inside the vehicle, starting of the engine of the vehicle 10 is permitted, as described above. However, an operation permission target is not limited thereto.

For example, a technology capable of moving or stopping the vehicle 10 when a user manipulates the portable device 20 at a location away from the vehicle 10 (remote parking) is known. When the remote parking is used, a situation in which an unintended collision of the user with the vehicle 10 can occur if movement of the vehicle 10 is permitted after the user is not distant from the vehicle 10 to some extent. Accordingly, when it is determined that the position of the portable device 20 estimated by the position estimation unit 114 is within an area more distant from the vehicle 10 than a predetermined distance, or more the operation control unit 116 may permit movement of the vehicle 10.

More specifically, a case in which various actuators (parking actuators) controlling an operation related to parking from starting to ending of an engine based on remote operation signals transmitted from the portable device 20 are provided in the vehicle 10 is assumed. At this time, when it is determined that the position of the portable device 20 is within an area more distant from the vehicle 10 than the predetermined distance, the operation control unit 116 may permit control of automated steering of a steering wheel, automated traveling or parting and stopping with the parking actuators based on remote operation signals transmitted from the portable device 20.

Modified Example of Communication Device

The case in which the number of communication devices performing the ranging communication with the portable device 20 is two (the first communication device 131 and the second communication device 132) has been mainly assumed. However, the number of communication devices performing the ranging communication with the portable device 20 may be three or more. In this case, for the communication device performing the ranging communication with the portable device 20, the position of the portable device 20 can be estimate based on the result of the ranging communication between the portable device 20 and each of three or more communication devices, and thus it is possible to estimate the position of the portable device 20 with higher accuracy. For example, of the three or more communication devices, one communication device may function as a master communication device and the remaining communication device may serve slave communication devices.

What is claimed is:

1. A communication device mounted on a mobile object, the communication device comprising:
an acquisition unit configured to acquire a ranging trigger signal for starting measurement of a distance between the communication device and a portable device carried by a person; and
a communication control unit configured not to start ranging communication for measurement of the distance based on a fact that first specific information defined in advance and necessary for determination of the mobile object does not match second specific information included in the acquired ranging trigger signal and necessary for determination of the mobile object, wherein the communication device is mounted in a first mobile object, wherein the acquisition unit acquires a first ranging trigger signal for starting measurement of a first distance between the communication device and a first portable device, wherein the communication control unit does not start first ranging communication for measurement of the first distance based on a fact that first specific information necessary for determination of the first mobile object does not match second specific information included in the first ranging trigger signal and necessary for determination of a second mobile object, wherein the communication control unit does not start the first ranging communication and maintains a reception waiting state of a ranging trigger signal based on the fact that the first specific information does not match the second specific information included in the first ranging trigger signal, wherein the communication control unit starts second ranging communication for measurement of a second distance between the communication device and a second portable device based on a fact that the first specific information is included in a second ranging trigger signal acquired from the second portable device in the reception waiting state, wherein the acquisition unit acquires, from the second ranging trigger signal, counter information that indicates a past number of times a ranging trigger signal has been transmitted from the second portable device to the communication device, and wherein the communication control unit outputs the counter information associated with a result of the second ranging communication to a control device.

2. The communication device according to claim 1, wherein the communication control unit considers the portable device not to be a suitable portable device and does not start the ranging communication based on the fact that the first specific information does not match the second specific information.

3. The communication device according to claim 1, wherein the communication control unit considers the portable device to be a suitable portable device and starts the ranging communication based on the fact that the first specific information matches the second specific information.

4. The communication device according to claim 1,
wherein the communication device is mounted in a first mobile object,
wherein the first specific information is specific information necessary for determination of the first mobile object, and
wherein the second specific information is specific information necessary for determination of a second mobile object different from the first mobile object.

5. The communication device according to claim 1, wherein the communication control unit starts the second ranging communication by controlling transmission to the second portable device of a second ranging request which is a signal for making a request for measurement of the second distance.

6. The communication device according to claim 1, wherein the communication control unit starts the second ranging communication by waiting for reception of a ranging signal which is a signal used to measure the second distance from the second portable device.

7. The communication device according to claim 1, wherein the communication control unit transitions to the reception waiting state based on success of authentication of the first portable device before the acquisition of the first ranging trigger signal and cancels the reception waiting state based on a fact that a predetermined time passes from the transition to the reception waiting state.

8. The communication device according to claim 1, wherein the communication control unit does not start the first ranging communication by not controlling transmission of a first ranging request which is a signal for making a request for measurement of the first distance to the first portable device.

9. The communication device according to claim 1, wherein the communication control unit does not start the first ranging communication by not responding with a second ranging signal corresponding to the first ranging signal even when the first ranging signal which is a signal used to measure the first distance is received from the first portable device.

10. The communication device according to claim 1, wherein the communication control unit starts the first ranging communication based on the fact that the first specific information matches the second specific information included in the first ranging trigger signal.

11. A computer-readable non-transitory storage medium that stores a program causing a computer to function as a communication device that is mounted in a mobile object and the computer includes an acquisition unit configured to acquire a ranging trigger signal for starting measurement of a distance between the communication device and a portable device carried by a person, and a communication control unit configured not to start ranging communication for measurement of the distance based on a fact that first specific information defined in advance and necessary for determination of the mobile object does not match second specific information included in the acquired ranging trigger signal and necessary for determination of the mobile object, wherein the communication device is mounted in a first mobile object, wherein the acquisition unit acquires a first ranging trigger signal for starting measurement of a first distance between the communication device and a first portable device, wherein the communication control unit does not start first ranging communication for measurement of the first distance based on a fact that first specific information necessary for determination of the first mobile object does not match second specific information included in the first ranging trigger signal and necessary for determination of a second mobile object, wherein the communication control unit does not start the first ranging communication and maintains a reception waiting state of a ranging trigger signal based on the fact that the first specific information does not match the second specific information included in the first ranging trigger signal, wherein the communication control unit starts second ranging communication for measurement of a second distance between the communication device and a second portable device based on a fact that the first specific information is included in a second ranging trigger signal acquired from the second portable device in the reception waiting state, wherein the acquisition unit acquires, from the second ranging trigger signal, counter information that indicates a past number of times a ranging trigger signal has been transmitted from the second portable device to the communication device, and wherein the communication control unit outputs the counter information associated with a result of the second ranging communication to a control device.

* * * * *